(12) United States Patent
Qiu et al.

(10) Patent No.: US 12,281,665 B2
(45) Date of Patent: Apr. 22, 2025

(54) COUPLING STRUCTURE FOR CART AND CART

(71) Applicant: Shenzhen Yihong Holding Group Co., Ltd., Shenzhen (CN)

(72) Inventors: Chunlong Qiu, Shenzhen (CN); Xiao Zhang, Shenzhen (CN)

(73) Assignee: Shenzhen Yihong Holding Group Co., Ltd., Shenzhen (CN)

( * ) Notice: Subject to any disclaimer, the term of this patent is extended or adjusted under 35 U.S.C. 154(b) by 0 days.

(21) Appl. No.: 18/972,584

(22) Filed: Dec. 6, 2024

(65) Prior Publication Data

US 2025/0102004 A1 Mar. 27, 2025

(30) Foreign Application Priority Data

Nov. 19, 2024 (CN) .......................... 202422814628.7

(51) Int. Cl.
*F16B 12/44* (2006.01)
*B62B 3/00* (2006.01)
*B62B 3/02* (2006.01)

(52) U.S. Cl.
CPC .............. *F16B 12/44* (2013.01); *B62B 3/005* (2013.01); *B62B 3/02* (2013.01); *B62B 2205/32* (2013.01)

(58) Field of Classification Search
CPC . F16B 12/44; B62B 3/005; B62B 3/02; B62B 2205/32
See application file for complete search history.

(56) References Cited

U.S. PATENT DOCUMENTS

| | | |
|---|---|---|
| 2010/0109268 A1 | 5/2010 | Koehler et al. |
| 2020/0109017 A1 | 4/2020 | Best |
| 2022/0379939 A1* | 12/2022 | Codispoti |
| 2023/0139044 A1* | 5/2023 | Goodell |
| 2024/0217572 A1* | 7/2024 | Luo |
| 2024/0262404 A1* | 8/2024 | Phillips |

\* cited by examiner

*Primary Examiner* — James A Shriver, II
*Assistant Examiner* — Nicholas R. Kandas

(57) ABSTRACT

A coupling structure for a cart comprises a first connector, a second connector, and a third connector. The first connector is detachably connected to the second connector, and the second connector is detachably connected to the third connector. The first connector is located inside the second connector, and the second connector is located inside the third connector, such that the first connector, the second connector, and the third connector form a three-layer ring-shaped embedded structure. According to the embodiments of the present disclosure, the coupling structure is stable, and has a strong bearing capacity. The cart using the coupling structure can load more objects, and has a stronger bearing capacity.

16 Claims, 8 Drawing Sheets

COUPLING STRUCTURE FOR CART AND CART

CROSS-REFERENCE TO RELATED APPLICATIONS

This application claims priority to Chinese Patent Application No. 202422814628.7 with a filing date of Nov. 19, 2024. The content of the aforementioned application, including any intervening amendments thereto, is incorporated herein by reference.

TECHNICAL FIELD

The present disclosure relates to the technical field of daily necessities, and in particular, relates to a coupling structure for a cart, and a cart.

BACKGROUND

A modern cart type storage box configured to store objects generally has only one layer, and the objects cannot be classified. Thus, it takes a great deal of time to search for a target object. However, layers of a multi-layer cart type storage box are not closely connected. When a to-be-stored object has an excessively large weight, a phenomenon such as bending or breakage occurs. In view of this, the present disclosure provides a coupling structure for a cart, and a cart. The coupling structure is stable, and has a strong bearing capacity. Layers of the cart are closely connected, so that the cart using the coupling structure can load more heavy objects, and has more excellent performance.

SUMMARY OF PRESENT INVENTION

The technical problem to be resolved by embodiments of the present disclosure is to provide a coupling structure for a cart and a cart in view of the fact that the existing carts cannot meet the storage requirements of modern home families.

To resolve the technical problem, the present disclosure provides a coupling structure for a cart, including a first connector, a second connector, and a third connector, where the first connector is detachably connected to the second connector, and the second connector is detachably connected to the third connector; and the first connector is located inside the second connector, and the second connector is located inside the third connector, such that the first connector, the second connector, and the third connector form a three-layer ring-shaped embedded structure.

Optionally, the first connector includes a first connector body and a first coupling disposed on the first connector body; the second connector includes a second connector body of a ring-shaped structure and a first coupling groove provided on the second connector body; and when the first connector body and the second connector body fit together, the first coupling is in coupling joint with the first coupling groove.

Optionally, the second connector further includes a second coupling; the third connector includes a third connector body of a ring-shaped structure and a second coupling groove provided on the third connector body; and when the second connector body and the third connector body fit together, the second coupling is in coupling joint with the second coupling groove.

Optionally, the second coupling and the first coupling groove are opposite to each other.

A cart is further provided in this embodiment. The cart includes a bottom plate, first support columns, a shelf, second support columns, and a cover plate;

the first connector is disposed on the first support column; the second connector is disposed on the second support column; the third connector is disposed on the shelf; the first connector is detachably connected to the second connector; and the second connector is detachably connected to the third connector, and the first connector is located inside the second connector, the second connector is located inside the third connector, such that the first connector, the second connector, and the third-connector form a three-layer ring-shaped embedded structure; and a fourth connector opposite to the first connector is further disposed on the other end of the first support column; a fifth connector is disposed on the bottom plate; the fourth connector is detachably connected to the fifth connector; a sixth connector opposite to the second connector is further disposed on the other end of the second support column; a seventh connector is disposed on the cover plate; and the sixth connector is detachably connected to the seventh connector.

Optionally, the first connector includes a first connector body and a first coupling disposed on the first connector body; the second connector includes a second connector body of a ring-shaped structure and a first coupling groove provided on the second connector body; and when the first connector body and the second connector body fit together, the first coupling is in coupling joint with the first coupling groove.

Optionally, the second connector further includes a second coupling; the third connector includes a third connector body of a ring-shaped structure and a second coupling groove provided on the third connector body; and when the second connector body and the third connector body fit together, the second coupling is in coupling joint with the second coupling groove.

Optionally, the second coupling and the first coupling groove are opposite to each other.

Optionally, the fourth connector and the second connector are the same or different; and the sixth connector and the first connector are the same or different.

Optionally, the third connector is located on a corner of the shelf.

Another cart is further provided in this embodiment, including a bottom plate, first support columns, shelves, second support columns, third support columns, and a cover plate, where a first connector is disposed on the first support column; a fourth connector opposite to the first connector is further disposed on the other end of the first support column; a second connector is disposed on the second support column; a sixth connector opposite to the second connector is further disposed on the other end of the second support column; two ends of the third support column are respectively provided with the first connector and the second connector; a third connector is disposed on the shelf; a fifth connector is disposed on the bottom plate; and a seventh connector is disposed on the cover plate;

the bottom plate is detachably connected to the first support column through the fourth connector and the fifth connector, to form a bottom layer of the cart;

the second support column is detachably connected to the cover plate through the sixth connector and the seventh connector, to form a top layer of the cart;

there are at least two shelves; and the shelf is connected to the first support column and the third support column, or the second support column and the third support column, or two third support columns through detachable connection between the first connector and the second connector and detachable connection between the second connector and the third connector, thereby forming middle layers of the cart; and there are at least two middle layers of the cart; and the first connector is located inside the second connector, and the second connector is located inside the third connector, such that the first connector, the second connector, and the third connector form a three-layer ring-shaped embedded structure.

Optionally, the first connector includes a first connector body and a first coupling disposed on the first connector body; the second connector includes a second connector body of a ring-shaped structure and a first coupling groove provided on the second connector body; and when the first connector body and the second connector body fit together, the first coupling is in coupling joint with the first coupling groove.

Optionally, the second connector further includes a second coupling; the third connector includes a third connector body of a ring-shaped structure and a second coupling groove provided on the third connector body; and when the second connector body and the third connector body fit together, the second coupling is in coupling joint with the second coupling groove.

Optionally, the second coupling and the first coupling groove are opposite to each other.

Optionally, the fourth connector and the second connector are the same or different; and the sixth connector and the first connector are the same or different.

Optionally, the third connector is located on a corner of the shelf.

The embodiments of the present disclosure have the following beneficial effects:

(1) In the embodiments of the present disclosure, the first connector, the second connector, and the third connector are embedded and in coupling with each other to form the three-layer ring-shaped embedded structure, such that the coupling structure have a tight structure and a strong bearing capacity. The cart using the coupling structure can load more objects, and has a stronger bearing capacity.

BRIEF DESCRIPTION OF THE DRAWINGS

To describe the technical solutions in the embodiment of the present disclosure or in the prior art more clearly, the following briefly introduces the accompanying drawings required for describing the embodiment or the prior art. Apparently, the accompanying drawings in the following description show merely some embodiments of the present disclosure, and a person of ordinary skill in the art may still derive other drawings from these accompanying drawings without creative efforts.

10, bottom plate; 110, first connector; 111, first connector body; 112, first coupling; 120, second connector; 121, second connector body; 122, first coupling groove; 123, second coupling; 130, third connector; 131, third connector body; 132, second coupling groove; 140, fourth connector; 141, third coupling; 150, fifth connector; 151, third coupling groove; 160, sixth connector; 161, fourth coupling; 170, seventh connector; 171, first coupling plate; 20, second support column; 30, second support column; 40, shelf; 50, cover plate; and 60, third support column.

DETAILED DESCRIPTION OF THE EMBODIMENTS

The technical solutions in embodiments of the present disclosure will be described below clearly and completely with reference to the accompanying drawings in the embodiments of the present disclosure. Apparently, the described embodiments are merely some, rather than all of the embodiments of the present disclosure. All other embodiments derived from the embodiments of the present disclosure by those of ordinary skill in the art without creative efforts shall fall within the protection scope of the present disclosure.

Embodiment 1

Figure 1:
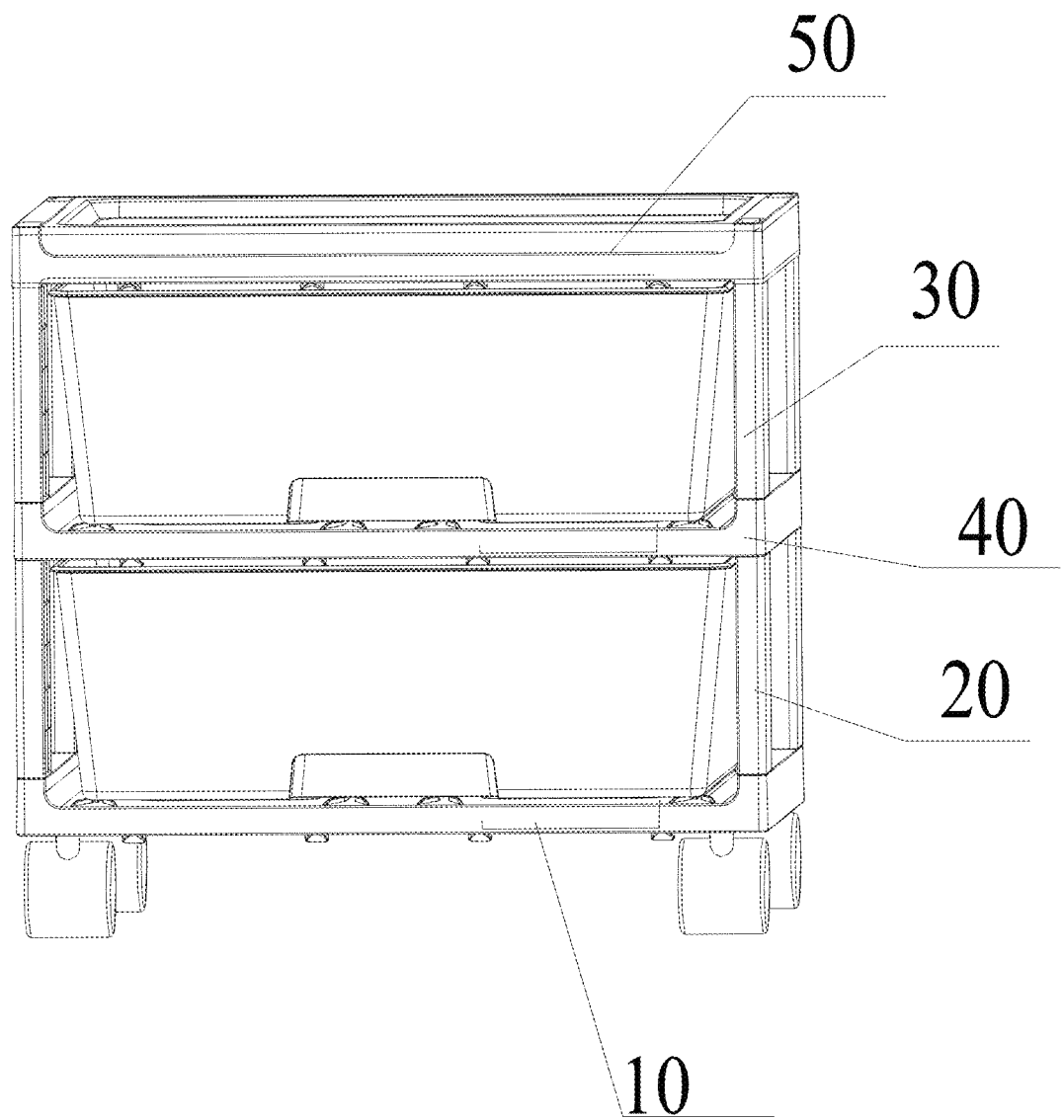
FIG. 1 is a schematic structural diagram showing a cart according to a first embodiment of the present disclosure.

Refer to FIG. 1. Specific implementations of the present disclosure provide a cart. The cart includes a bottom plate 10, first support columns 20, a shelf 40, second support columns 30, and a cover plate 50.

Wheels are disposed on the bottom plate 10. The wheels rotate to move the cart. The bottom plate 10, the shelf 40, and the cover plate 50 are separately connected to the first support columns 20 and the second support columns 30 to form the cart. Storage apparatus such as a box can be placed on each of the bottom plate 10, the shelf 40, and the cover plate 50.

Embodiment 2

Figure 2:
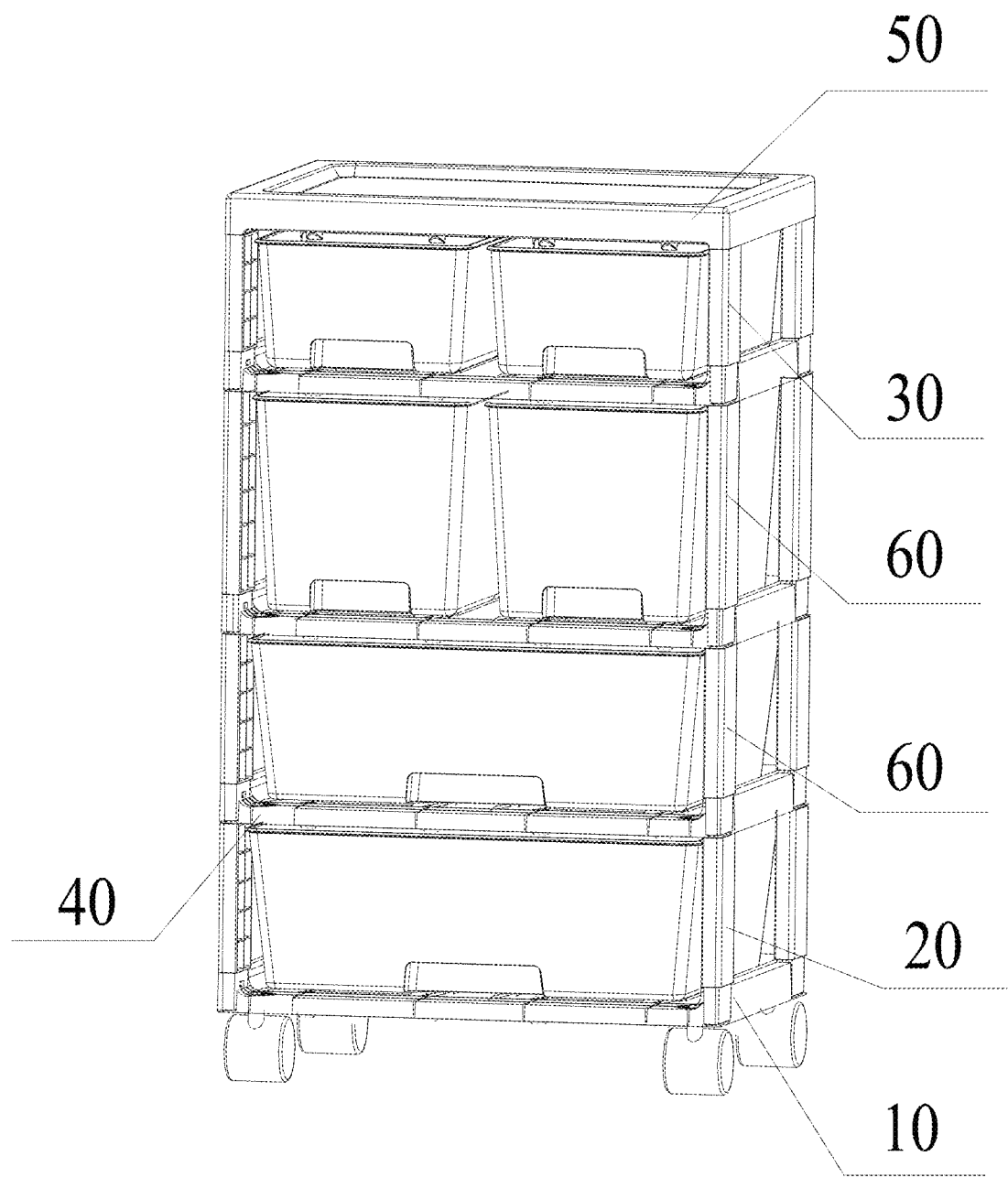
FIG. 2 is a schematic structural diagram showing a cart according to a second embodiment of the present disclosure.
Figure 3:
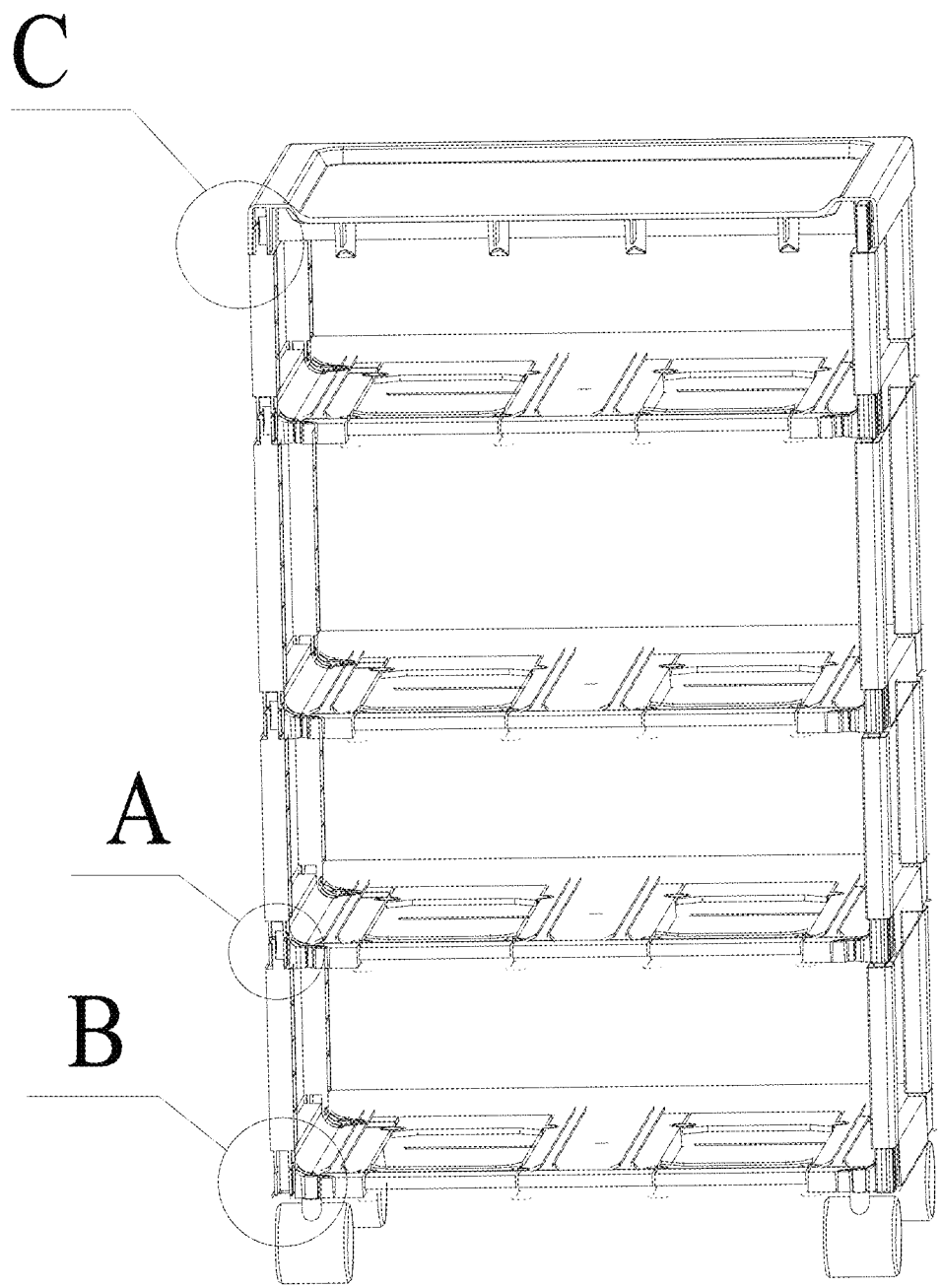
FIG. 3 is a sectional diagram showing a cart according to the second embodiment of the present disclosure.
Figure 4:
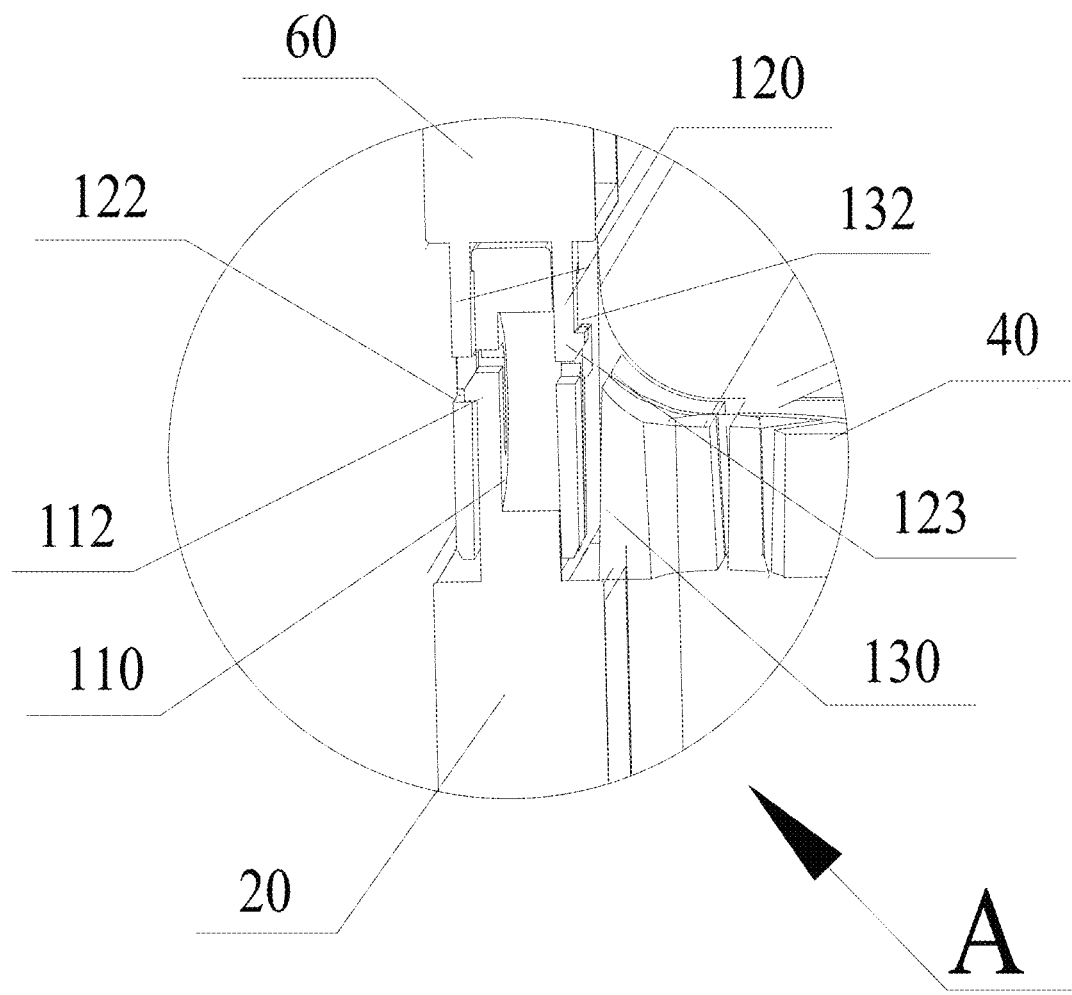
FIG. 4 is a partial enlarged view showing a region A in FIG. 3.
Figure 5:
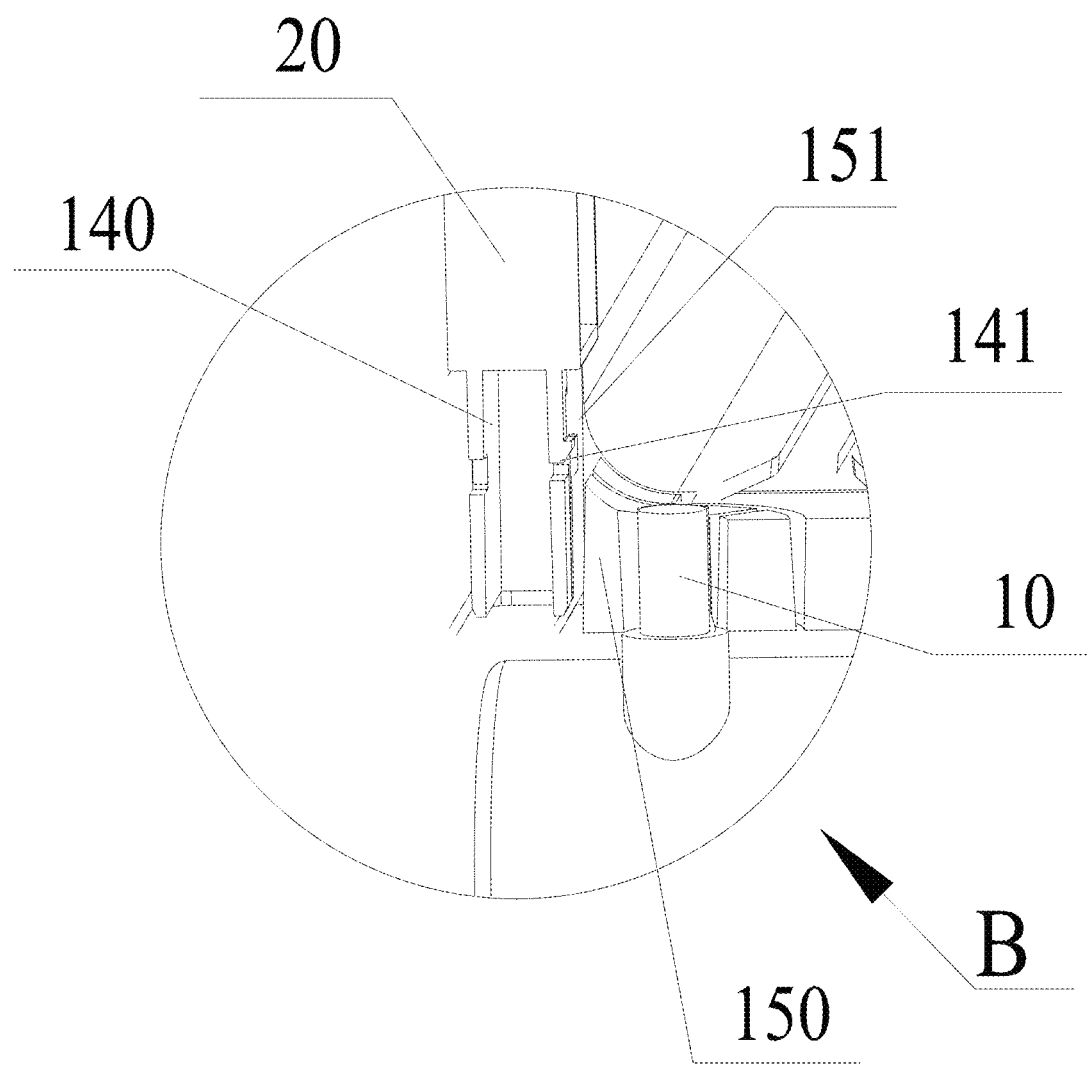
FIG. 5 is a partial enlarged view showing a region B in FIG. 3.
Figure 6:
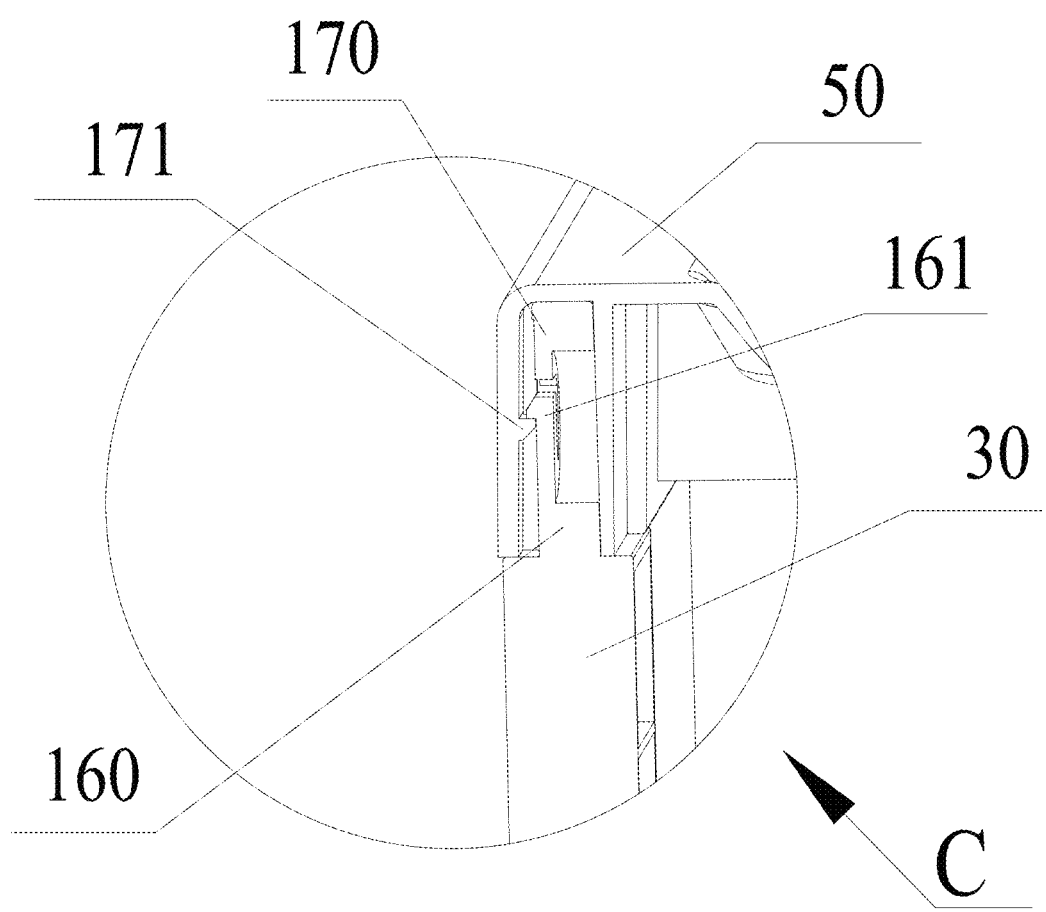
FIG. 6 is a partial enlarged view showing a region C in FIG. 3.

Refer to FIG. 2. Specific implementations of the present disclosure further provide a cart. A connection manner of the cart is the same as that of the cart in Embodiment 1. The cart includes a bottom plate 10, first support columns 20, shelves 40, second support columns 30, third support columns 60, and a cover plate 50.

The bottom plate 10, the shelves 40, and the cover plate 50 are separately connected to the first support columns 20, the second support columns 30, and the third support columns 60 to form the cart. There are at least two shelves 40, and the plurality of shelves 40 are connected through the plurality of third support columns 60.

The bottom plate and the first support columns form a bottom layer of the cart. The second support columns and the cover plate form a top player of the cart. The shelf 40 is connected to the first support column 20 and the third support column 60 or the second support column 30 and the third support column 60 or two third support columns 60, thereby forming middle layers. There are at least two middle layers, so that the cart of a multi-layer structure is constructed.

Refer to FIG. 3 to FIG. 8. The first support column 20, the second support column 30, the third support column 60 and the shelf 40 are connected with each other through the first connector 110, the second connector 120, and the third connector 130, to form the cart. The first support column 20 is connected to the bottom plate 10 through connection between a fourth connector 140 and a fifth connector 150. The second support column 30 is connected to the cover plate 50 through connection between a sixth connector 160 and a seventh connector 170. The first connector 110 is detachably connected to the second connector 120. The second connector 120 is detachably connected to the third connector 130. The fourth connector 140 is detachably connected to the fifth connector 150. The sixth connector 160 is detachably connected to the seventh connector 170. The first connector 110 is located inside the second connector 120, and the second connector 120 is located inside the third connector 130, such that the first connector 110, the second connector 120, and the third connector 130 form a three-layer ring-shaped embedded structure.

Specifically, the first connector 110 is disposed on one end of the first support column 20, and the fourth connector 140 is disposed on the other end of the first support column 20. The second connector 120 is disposed on one end of the second support column 30, and the sixth connector 160 is disposed on the other end of the second support column 30. Two ends of the third support column 60 are respectively provided with the first connector 110 and the second connector 120. The shelf 40 is provided with the third connector 130, and the third connector 130 is located on a corner of the shelf 40. The fifth connector 150 is disposed on the bottom plate 10. The seventh connector 170 is disposed on the cover plate 50.

The bottom plate 10 is detachably connected to the first support column 20 through the fourth connector 140 and the fifth connector 150, to form a bottom layer of the cart.

The second support column 30 is detachably connected to the cover plate 50 through the sixth connector 160 and the seventh connector 170, to form a top layer of the cart.

There are at least two shelves 40. When there are only two shelves 40. One shelf 40 is connected to the first support column 20 and the third support column 60 through detachable connection between the first connector 110 and the second connector 120, and detachable connection between the second connector 120 and the third connector 130. The other shelf 40 is connected to the second support column 30 and the third support column 60 through detachable connection between the first connector 110 and the second connector 120, and detachable connection between the second connector 120 and the third connector 130. When there are more than two shelves 40, the bottommost shelf 40 is connected to the first support column 20 and the third support column 60 through detachable connection between the first connector 110 and the second connector 120, and detachable connection between the second connector 120 and the third connector 130. The topmost shelf 40 is connected to the second support column 30 and the third support column 60 through detachable connection between the first connector 110 and the second connector 120, and detachable connection between the second connector 120 and the third connector 130. The other shelves 40 are connected to two third support columns 60 through detachable connection between the first connector 110 and the second connector 120, and detachable connection between the second connector 120 and the third connector 130.

Figure 7:
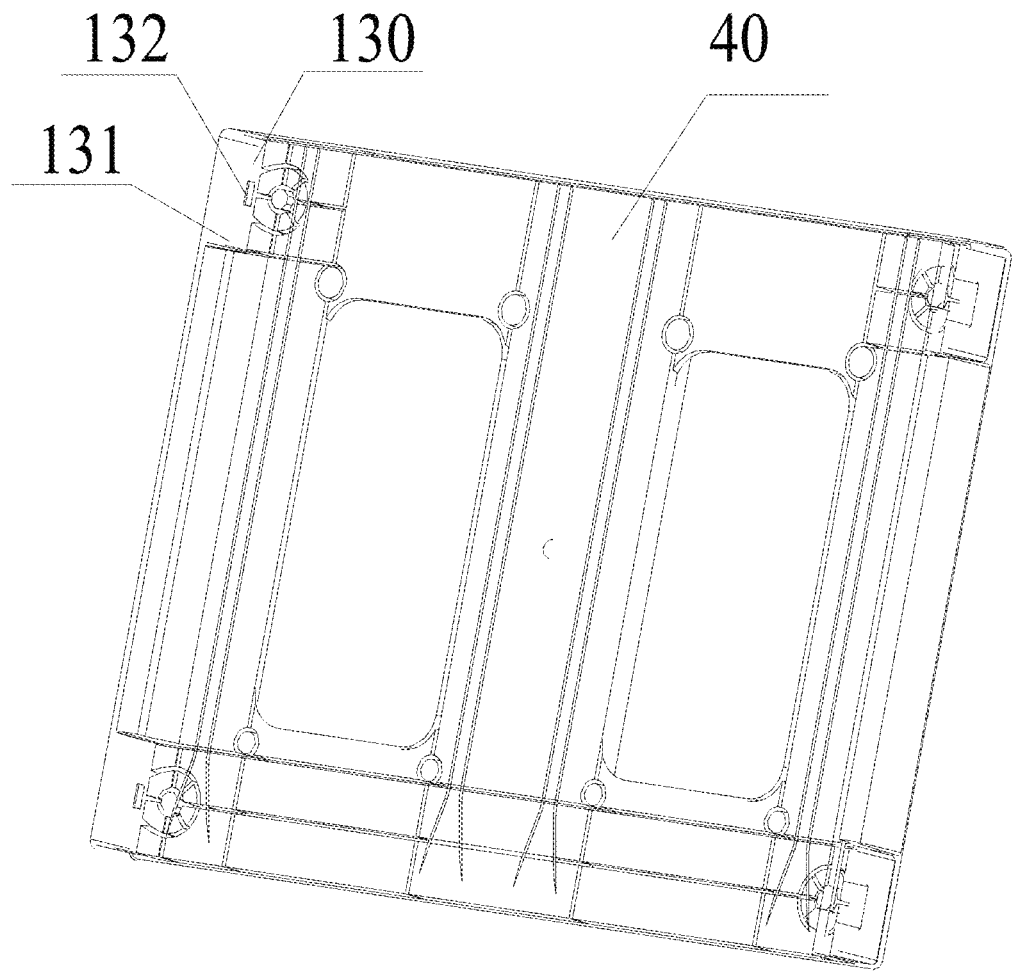
FIG. 7 is a structural schematic diagram showing a shelf of a cart according to the second embodiment of the present disclosure.
Figure 8:
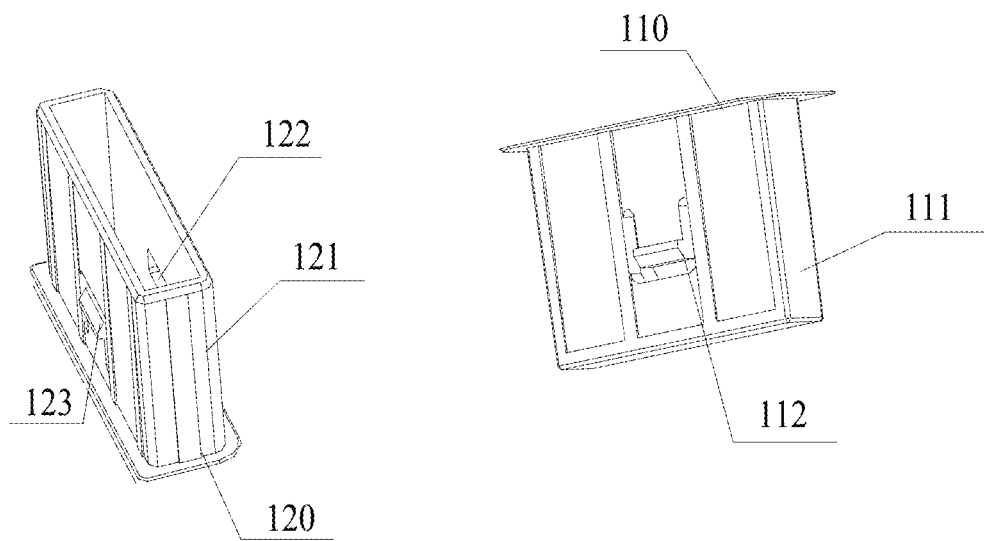
FIG. 8 is a structural schematic diagram showing a first connector and second connector of a cart according to a second embodiment of the present disclosure.

Refer to FIG. 7 and FIG. 8. The first connector 110 includes a first connector body 111 and a first coupling 112 disposed on the first connector body 111. The second connector 120 includes a second connector body 121 of a ring-shaped structure, a first coupling groove 122 provided on the second connector body 121, and a second coupling 123 disposed on the second connector body 121. The third connector 130 includes a third connector body 131 of a ring-shaped structure and a second coupling groove 132 provided on the third connector body 131. The first connector body 111 is long-bar-shaped. The second connector body 121 is a ring-shaped structure with an opening in an end. An outline of the first connector body 111 is mutually adaptive to the opening of the second connector body 121. The third connector body 131 is a ring-shaped structure with openings in both ends. An outline of the second connector body 121 is mutually adaptive to an inner ring of the third connector body 131.

When the first connector 111 and the second connector body 121 fit together, the first coupling 112 is in coupling joint with the third coupling groove 122. When the second connector 121 and the third connector body 131 fit together, the second coupling 123 is in coupling joint with the second coupling groove 132. The second coupling 123 and the first coupling groove 122 are opposite to each other, such that a three-layer ring-shaped embedded structure formed by the first connector 110, the second connector 120, and the third connector 130 have a stronger bearing capacity and be more stable.

The fourth connector 140 and the second connector 120 are the same or different. In this embodiment, the fourth connector 140 includes a third coupling 141. The fifth connector 150 includes a third coupling groove 151. The third coupling 141 is in coupling joint with the third coupling groove 151.

The sixth connector 160 and the first connector 110 are the same or different. In this embodiment, the sixth connector 160 includes a fourth coupling 160. The seventh connector 170 includes a first coupling plate 171. The first coupling plate 171 is located on an inner wall of the seventh connector 170. The fourth coupling 160 is in coupling joint with the first coupling plate 171.

The foregoing disclosed is merely one preferred embodiment of the present disclosure, and certainly shall not be used to limit the scope of the claims of the present disclosure. A person of ordinary skill in the art can understand all or some of the procedures for implementing the foregoing embodiment and make equivalent changes according to the claims of the present disclosure. The equivalent changes still fall within the scope of the present disclosure.

What is claimed is:

1. A coupling structure for a cart, comprising a first connector, a second connector, and a third connector, wherein the first connector is detachably connected to the second connector, and the second connector is detachably connected to the third connector; and the first connector is located inside the second connector, and the second connector is located inside the third connector, such that the first connector, the second connector, and the third connector form a three-layer ring-shaped embedded structure.

2. The coupling structure according to claim 1, wherein the first connector comprises a first connector body and a first coupling disposed on the first connector body; the second connector comprises a second connector body of a ring-shaped structure and a first coupling groove provided on the second connector body; and when the first connector body and the second connector body fit together, the first coupling is in coupling joint with the first coupling groove.

3. The coupling structure according to claim 2, wherein the second connector further comprises a second coupling; the third connector comprises a third connector body of a ring-shaped structure and a second coupling groove provided on the third connector body; and when the second connector body and the third connector body fit together, the second coupling is in coupling joint with the second coupling groove.

4. The coupling structure according to claim 3, wherein the second coupling and the first coupling groove are opposite to each other.

5. A cart, comprising a bottom plate, first support columns, a shelf, second support columns, and a cover plate, wherein
   a first connector is disposed on the first support column; a second connector is disposed on the second support column; a third connector is disposed on the shelf; the first connector is detachably connected to the second connector; the second connector is detachably connected to the third connector; and the first connector is located inside the second connector, and the second connector is located inside the third connector, such that the first connector, the second connector, and the third-connector form a three-layer ring-shaped embedded structure; and
   a fourth connector opposite to the first connector is further disposed on the other end of the first support column; a fifth connector is disposed on the bottom plate; the fourth connector is detachably connected to the fifth connector; a sixth connector opposite to the second connector is further disposed on the other end of the second support column; a seventh connector is disposed on the cover plate; and the sixth connector is detachably connected to the seventh connector.

6. The cart according to claim 5, wherein the first connector comprises a first connector body and a first coupling disposed on the first connector body; the second connector comprises a second connector body of a ring-shaped structure and a first coupling groove provided on the second connector body; and when the first connector body and the second connector body fit together, the first coupling is in coupling joint with the first coupling groove.

7. The cart according to claim 6, wherein the second connector further comprises a second coupling; the third connector comprise a third connector body of a ring-shaped structure and a second coupling groove provided on the third connector body; and when the second connector body and the third connector body fit together, the second coupling is in coupling joint with the second coupling groove.

8. The cart according to claim 7, wherein the second coupling and the first coupling groove are opposite to each other.

9. The cart according to claim 5, wherein the fourth connector and the second connector are the same or different; and the sixth connector and the first connector are the same or different.

10. The cart according to claim 5, wherein the third connector is located on a corner of the shelf.

11. A cart, comprising a bottom plate, first support columns, shelves, second support columns, third support columns, and a cover plate, wherein a first connector is disposed on the first support column; a fourth connector opposite to the first connector is further disposed on the other end of the first support column; a second connector is disposed on the second support column; a sixth connector opposite to the second connector is further disposed on the other end of the second support column; two ends of the third support column are respectively provided with the first connector and the second connector; a third connector is disposed on the shelf; a fifth connector is disposed on the bottom plate; and a seventh connector is disposed on the cover plate;
   the bottom plate is detachably connected to the first support column through the fourth connector and the fifth connector, to form a bottom layer of the cart;
   the second support column is detachably connected to the cover plate through the sixth connector and the seventh connector, to form a top layer of the cart;
   there are at least two shelves; and the shelf is connected to the first support column and the third support column, or the second support column and the third support column, or two third support columns through detachable connection between the first connector and the second connector and detachable connection between the second connector and the third connector, thereby forming middle layers of the cart; and there are at least two middle layers of the cart; and
   the first connector is located inside the second connector, and the second connector is located inside the third connector, such that the first connector, the second connector, and the third connector form a three-layer ring-shaped embedded structure.

12. The cart according to claim 11, wherein the first connector comprises a first connector body and a first coupling disposed on the first connector body; the second connector comprises a second connector body of a ring-shaped structure and a first coupling groove provided on the second connector body; and when the first connector body and the second connector body fit together, the first coupling is in coupling joint with the first coupling groove.

13. The cart according to claim 12, wherein the second connector further comprises a second coupling; the third connector comprises a third connector body of a ring-shaped structure and a second coupling groove provided on the third connector body; and when the second connector body and the third connector body fit together, the second coupling is in coupling joint with the second coupling groove.

14. The cart according to claim 13, wherein the second coupling and the first coupling groove are opposite to each other.

15. The cart according to claim 11, wherein the fourth connector and the second connector are the same or different; and the sixth connector and the first connector are the same or different.

16. The cart according to claim 11, wherein the third connector is located on a corner of the shelf.

* * * * *